Nov. 21, 1961     J. P. KUBES     3,009,596
SHIPPING CONTAINER
Original Filed Nov. 11, 1956     3 Sheets-Sheet 1
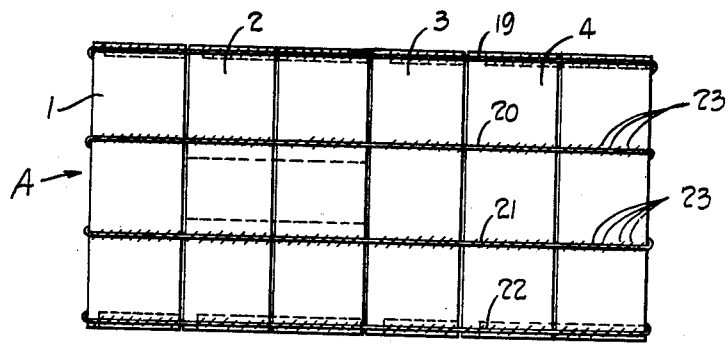
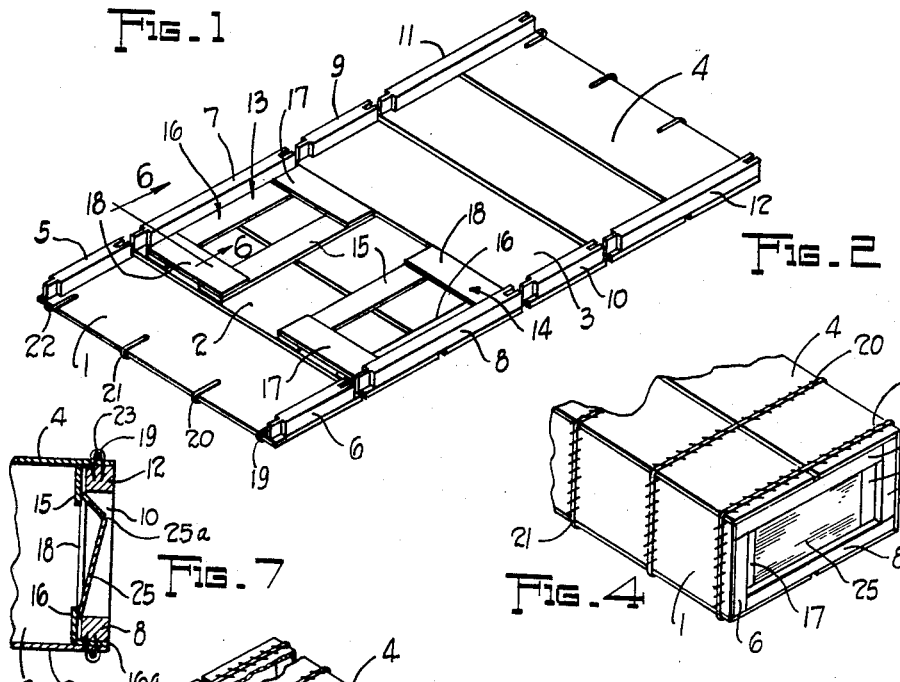
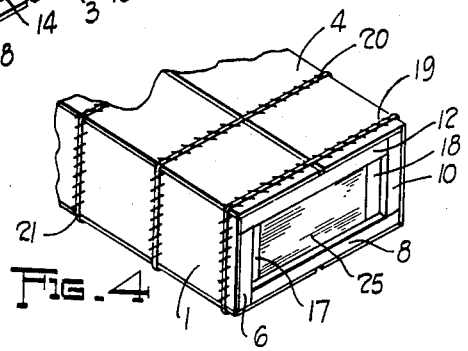
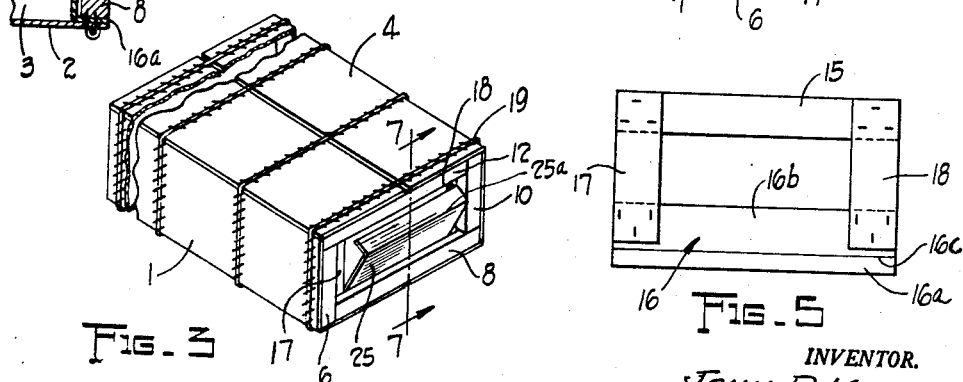
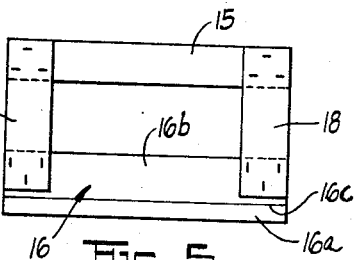
INVENTOR.
JOHN P. KUBES
BY Robb & Robb
attorneys Nov. 21, 1961  J. P. KUBES  3,009,596
SHIPPING CONTAINER
Original Filed Nov. 11, 1956
3 Sheets-Sheet 2
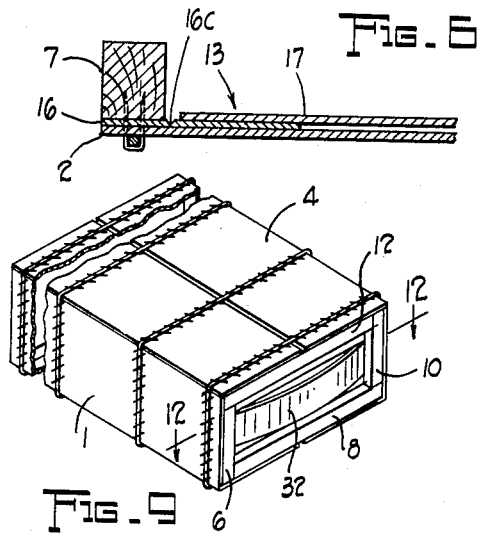
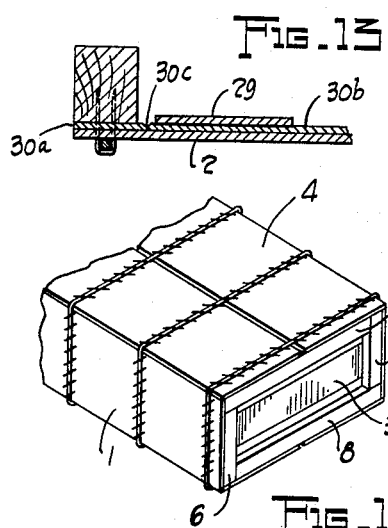
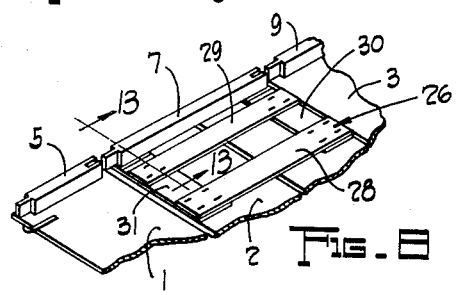
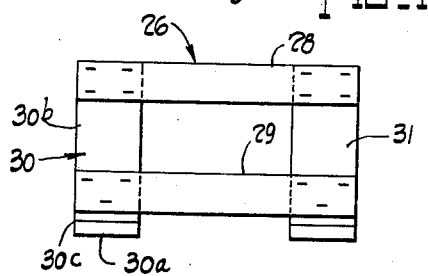
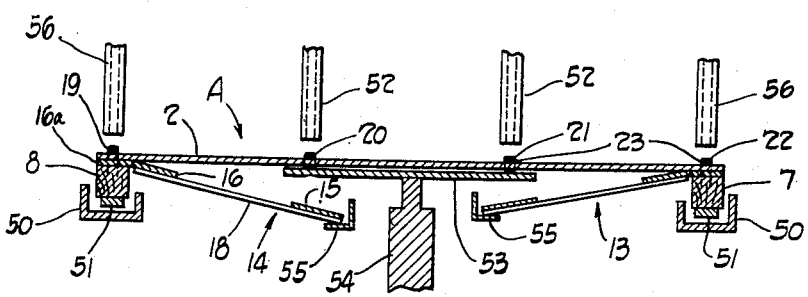
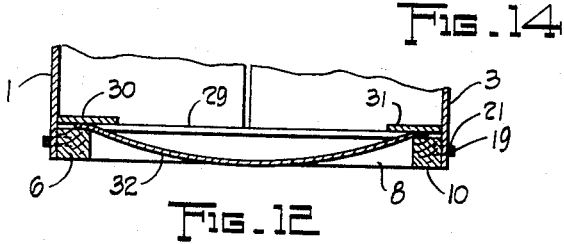
INVENTOR.
JOHN P. KUBES
BY
Robb+Robb
attorneys

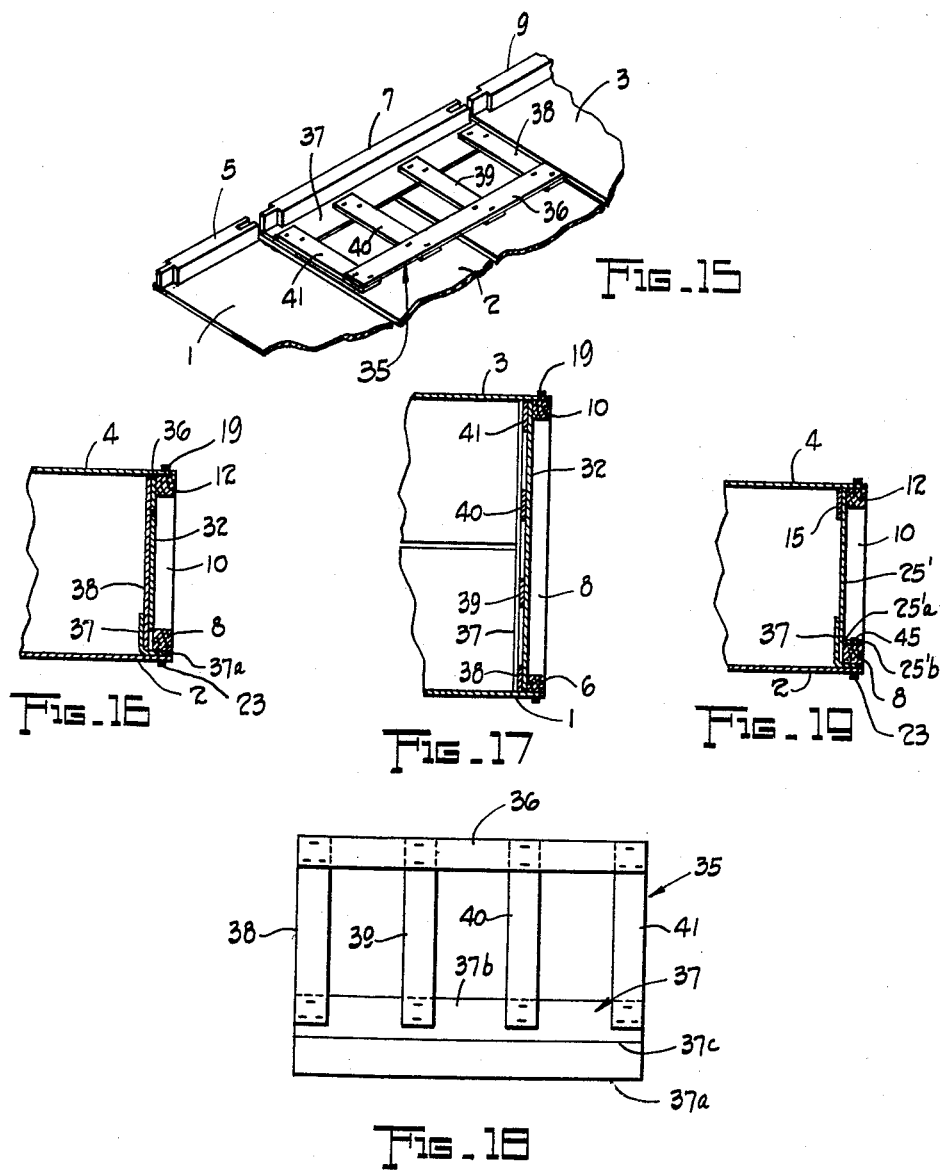

United States Patent Office 3,009,596
Patented Nov. 21, 1961

3,009,596
SHIPPING CONTAINER
John P. Kubes, 5825 Flower Drive, Parma Heights, Ohio
Original application Nov. 11, 1956, Ser. No. 619,779, now Patent No. 2,979,727, dated Apr. 18, 1961. Divided and this application Feb. 20, 1961, Ser. No. 90,269
9 Claims. (Cl. 217—47)

This application is a division of my co-pending application Serial No. 619,779, filed November 11, 1956, now Patent No. 2,979,727.

This application relates to shipping containers of the type commonly referred to as "knock-down" containers, and more particularly the present invention appertains to such knock-down containers of the wire bound type which are especially designed for packing and processing of fast frozen dressed poultry.

In the processing of dressed frozen poultry and the readying of the same for shipment, it is customary to pack the dressed poultry in the shipping containers prior to subjecting the poultry to the freezing process. Under such conditions it is desirable and expedient to provide openings in the container which will render the freezing process more quickly effective. To this end, wire bound containers comprising side members bound together by wires and such side members each consisting of two or more separated panels have commonly been employed, but it is found that in addition to the openings provided by the separated panels, it is expedient for more quickly completing the freezing process, to pack the dressed poultry in such containers the ends of which have been left open to be closed after completion of the freezing process by securing suitable end closing panels in place on such containers.

It is one of the principal objects of the present invention to provide a novel shipping container especially adapted for processing frozen dressed poultry, wherein such container comprises a unitary structure substantially completely preassembled as to its various structural elements and shipped to its point of use initially in knock down condition.

It is also a principal object of the invention to provide such a shipping container in which the dressed poultry may be packed substantially ready for shipment prior to the freezing process, said container comprising pre-assembled end members having openings therein together with auxiliary end closing panels which cooperate with the container structure in a novel manner to close the openings in the ends thereof after freezing of the poultry therein by merely slipping the auxiliary end closing panels in place without using other fastening or securing means for assembly of said auxiliary end panels.

Shipping containers of the type to which the invention relates commonly comprise a mat consisting of flexibly connected side members or sections initially disposed in a common plane and provided with binding wires extending longitudinally thereof. Each of the side members or sections is ordinarily provided with a pair of cleat members, one at each side edge of the respective sections; and staples are used to secure the wires to the side members. The staples securing the wires extending along the side edges of the mat serve also to secure the cleat members to said side members. The mats or container blanks made up in the form just described are commonly shipped from the factory in flat condition to the point of use where they are formed up to box form at such point of use.

With each shipment of container blanks or mats in flat or knock-down condition above described there are also supplied a number of separate end members, two for each container mat or blank, the end members being supplied separately, unassembled with respect to the container blanks and designed to be assembled in conjunction therewith when the container mats or blanks are formed into box form at the point of use.

It is a further principal object of the present invention to provide such a knock-down container construction in which the end members are pre-assembled to their respective container mats at the factory prior to shipment of the containers in knock-down or flat condition to point of use.

A further object of the invention is to provide such a container construction in which the end members are pre-assembled to their respective mats in permanently secured relation thereto without the necessity for employing additional securing means for so securing the end members, other than the securing means already utilized in the production of the mat.

A further object of the invention is to provide such a knock-down container in which the end members are pre-assembled to the mat at the factory by the use of machines now used for assembly of the mat parts but not heretofore used for securing the end members to the mat.

A further object of the invention is to provide such a container construction in which each of the end members comprises a hinge portion formed of a single piece of flexible material including an edge securing part and a main body part hingedly movable relative thereto, both said parts constituting integral parts of said single piece of material.

Still another object of the invention is to provide such a container construction in which the end members are of composite form comprising a stiff, relatively non-resilient end panel and a hinge portion formed of a single piece of flexible material.

A further object of the invention is to provide novel apparatus and method of making the containers of the type referred to. To this end, my invention contemplates the provision of apparatus for making such wire bound shipping containers, wherein such apparatus is provided with means for enabling the end members to be secured in hinged relation to respective side members of the container by the same operation which heretofore has been employed to secure the binding wires and cleat members to the side members without requiring additional separate operations for such purpose and in a manner to avoid the undesired securing of the end members to portions of the side members other than the desired securing of the end members in hinged relation to opposite side edges of the container mats.

In carrying my invention into practice I provide a knock-down container construction of the class described which comprises a mat consisting of flexibly connected side members or sections and a respective cleat member at each side edge of each side member, and a pair of end members each comprising a stiff panel and a hinge portion formed of a single piece of flexible material; each hinge portion comprises a main body portion or part secured to the stiff panel and also comprises an edge securing portion adapted to be secured to the side edge of one of the side members or sections at one side edge of the mat, the other end member having its corresponding edge securing portion secured to one of the side members at the opposite side edge of the mat. The main body parts of the end members are hingedly movable relative to their edge securing parts and the hinge portion is preferably scored intermediate the two parts thereof to facilitate the hinge action. A respective binding wire extends along each side edge of the mat and these binding wires are secured to each of the side members or sections by means of staples which also serve to secure the cleat members to the respective side members or sections. The end members are secured at the locations designated by inserting the edge securing parts thereof between the respective cleat member and its side member prior to the stapling operation so that the stapling of the wires to the side members serves also to secure the members in hinge relation to the mats.

In accordance with my invention the end members each comprise a first set of spaced frame parts one of which engages the inner faces of the adjacent cleat members and a second set of spaced frame parts secured to the first frame parts and disposed in a common plane spaced from said adjacent cleat members, the frame parts of each end member providing an opening therein. A separate panel member is provided for each end member and is insertable between said second frame parts and the said adjacent cleat members so that the panel member will lie in the plane of the frame part which engages said cleat members, for closing the openings in the respective end member. One of the frame parts of each end member comprises a hinge element formed of flexible material and having an edge securing part, each end member having its edge securing part separately inserted between a respective cleat member and its respective side member. Fastening members are provided which secure the side members to said cleat members and which also secure said edge securing part between the respective cleat member and its respective side member.

The frame parts of each end member of the construction of my invention includes top and bottom frame parts and interconnecting cross frame parts. In one form of the invention the bottom frame part comprises the hinge element formed of flexible material and secured in the manner above indicated between the respective cleat and side member. In another form of the invention the cross frame parts comprise the hinge elements formed of flexible material and secured in the manner above indicated between a respective cleat member and a respective side member.

In order to enable the assembly of the end members in the manner above indicated by the use of apparatus similar to that heretofore employed which serves to staple the binding wires to the side members and to staple the cleats to the side members it is necessary to provide means for preventing the staples which secure the binding wires intermediate the edges of the mat from passing through portions of the end members other than their edge securing parts above mentioned. For this purpose the invention contemplates the provision in such apparatus of staple clinching anvil means interposed between the side members and the end members at the locations of the stapling heads of such apparatus which serve to staple the intermediate wires to the side members of the container mat as it passes through such apparatus.

Other objects, advantages and features of the invention will become apparent from the following detailed description taken in conjunction with the accompanying drawings in which:

FIGURE 1 is a top plan of a container mat construction embodying the invention and showing the same in knock-down or flat condition looking toward the outer face of the mat.

FIGURE 2 is a perspective view of the same looking toward the opposite or inner face of the mat.

FIGURE 3 is a perspective view showing the container formed in box form, and closed as when packed ready for shipment, portions being broken away to show the interior construction, this figure showing the insertable end panel as when partially inserted.

FIGURE 4 is a similar perspective view partially broken away showing the insertable end panel as when fully inserted.

FIGURE 5 is a plan view of one of the end members alone as embodied in the form of the invention shown in FIGURES 2 to 7 inclusive.

FIGURE 6 is a sectional view taken substantially on the line 6—6 of FIGURE 2.

FIGURE 7 is a sectional view taken substantially on the line 7—7 of FIGURE 3.

FIGURE 8 is a perspective view similar to FIGURE 2 but showing a modification of the invention.

FIGURE 9 is a perspective view similar to FIGURE 3 but showing the modified end members of FIGURE 8 and the modified insertable panel members partially inserted.

FIGURE 10 is a perspective view of the same showing the panel members fully inserted.

FIGURE 11 is a plan view of one of the end members of the form of the invention shown in FIGURES 8 to 13 inclusive.

FIGURE 12 is a sectional view taken substantially on the line 12—12 of FIGURE 9.

FIGURE 13 is a sectional view taken substantially on the line 13—13 of FIGURE 8.

FIGURE 14 is a vertical sectional view showing the essential parts of an apparatus according to the invention for stapling the intermediate binding wires to the side members of the mat, the same illustrating clincher anvil means interposed between portions of the end members and the side members of the mat and its relation to the stapling heads of the apparatus for stapling the intermediate binding wires to the side members of the mat.

FIGURES 15 to 18 inclusive show a further modification, FIGURE 15 being a perspective view similar to FIGURE 8, FIGURE 16 being a sectional view similar to FIGURE 7, FIGURE 17 being a sectional view similar to FIGURE 12, and FIGURE 18 being a plan view of one of the end members of the form of the invention shown in FIGURES 15 to 18 inclusive; and FIGURE 19 is a sectional view similar to FIGURE 16 but showing a further modification.

Now referring to the drawings and describing the invention in detail, reference is initially made to FIGURES 1 to 7 inclusive and especially to the form of the invention embodied in FIGURES 2 to 7 inclusive.

The container construction shown comprises a mat generally designated by the letter A consisting of flexibly connected side members or sections generally designated 1, 2, 3, and 4. The side members 1, 2, 3, and 4 respectively comprise front, bottom rear, and cover sections, the side members or sections 1, 2, 3, and 4 may be made of any suitable material as for example rotary cut veneer or re-saw lumber and the side members or sections may each comprise one or more boards or panels as shown. In the container illustrated the front and rear side members or sections 1 and 3 each comprise a single board or panel while the bottom and cover sections 2 and 4 each comprise two panels or boards.

Each of the side members or sections has secured thereto wooden cleats, one disposed at each side edge thereof. The cleat members secured to the side member 1 are designated 5 and 6; the cleat members secured to the side member 2 are designated 7 and 8; the cleat members secured to the side member 3 are designated 9 and 10; the cleat members secured to the side member 4 are designated 11 and 12. These cleat members are each provided with a tongue element at one end and a groove at the opposite end and the cleat members are arranged so that the tongue element of each cleat member cooperates with the groove of the next adjacent cleat member when the mat is formed to box form, as shown in FIGURES 3 and 4 and also in FIGURES 9 and 10.

Each of the containers of the construction of FIGURES 2 to 7 inclusive is provided with a pair of end members generally designated by the numerals 13 and 14 which are preassembled to the mat A at the factory producing the same. Each of the end members 13 and 14 comprises a top frame part 15 and a bottom frame part 16 and cross frame parts 17 and 18 secured to the top and bottom frame parts as shown by staples or other suitable fastenings. The top and bottom frame parts 15 and 16 are disposed in a common plane and the cross frame parts 17 and 18 are disposed in another common plane offset from the plane of the frame parts 15 and 16. The frame parts 15, 17, and 18 are preferably made of relatively stiff material such as the material of which the side members are formed. The bottom frame part 16 preferably is formed of flexible material such as fiber board or corrugated fiber board or like material, the same comprising a hinge portion for the end member 13 or the end member 14, said hinge portion being formed of a single piece of such flexible material. The hinge portion or frame part 16 of each end member includes an edge securing part 16a and a main body part 16b hingedly movable relative to the part 16a. The hinge portion or frame part 16 may be scored as indicated at 16c intermediate the parts 16a and 16b to facilitate such hinge movement.

The end members 13 and 14 are secured to the mat at opposite side edges thereof as shown, the edge securing part 16a of the hinge portion or bottom frame part 16 of each end member being inserted between one of the cleats 7 or 8 and a respective side member such as 2.

As seen best in FIGURE 1, the wood panels comprising the side members 1, 2, 3, and 4 are flexibly connected together by means of binding wires 19, 20, 21 and 22 which are secured to the sides by means of staples 23. The binding wires 19 and 22 are disposed along the opposite side edges of the mat on one face thereof and the cleat members are disposed along the side edges of the mat on the opposite face thereof so that the staples 23 which secure the binding wires 19 and 22 to the side members pass through the same and into the cleat members whereby the latter are secured to the side members by the same staple. It is also to be noted that since the part 16a of the end member 13 is inserted between the cleat 7 on side member 2 prior to the stapling operation, the staples 23 which secure the binding wire 22 to the side member 2 and pass into the cleat 7 serve to secure the end member 13 as well as the cleat 7 to the side member 2. In a similar manner the edge portion 16a of the end member 14 is secured to the side member 2 between the latter and the cleat member 8 by means of the staples 23 that secure the binding wire 19 to the side member 2 and pass through the part 16a of end member 14 and into the cleat 8.

Thus it will be apparent that in the use of my invention no additional fastening means are required for the securing of the end members in hinge relation to the mat other than the fastening means heretofore used to secure the binding wires and the cleats to the side members.

The containers will be shipped from the factory where made to a point of use in flat or knock-down condition substantially as shown in FIGURES 1 and 2 and the same will be formed up to box form at the point of use by positioning the sections 1 and 3 in planes perpendicular to the plane of the section 2, then bending up the end members 13 and 14 into planes perpendicular to the bottom 2, after which the side edges of end member 13 may be nailed or otherwise secured to the adjacent cleat members 5 and 9 and the side edges of the member 14 may similarly be secured to the adjacent cleats 6 and 10.

Since the container of the invention is designed especially for processing and shipment of frozen poultry, the same will be packed with poultry to be frozen with the container in condition ready for shipment substantially in the condition shown by FIGURES 3 and 4 except that the insertable panel members 25 will not have been inserted in the ends of the container to close the openings formed in the end members 13 and 14 by the arrangement of the frame parts 15, 16, 17 and 18.

With the container in condition of FIGURES 3 and 4 and packed with poultry to be frozen but with the panels 25 not inserted, the poultry so packed will be subjected to the freezing process which is more quickly effective in view of the openings in the end members of the container provided by the arrangement of the frame parts. After the completion of the freezing process, the openings in the end members 13 and 14 will be closed by the insertion of the panel members 25 in the manner indicated in FIGURES 3, 4, and 7. In this connection it will be noted that the arrangement of the frame parts of the end members is such that when the container is formed to box form as shown in FIGURES 3 and 4 the cross frame members or parts 17 and 18 will engage the inner faces of adjacent cleat members while the frame parts 15 and 16 will be spaced from said adjacent cleat members inwardly therefrom. Thus the cross frame part 17 will engage the inner faces of cleat members 7, 9 and 11 and cross frame part 18 will engage the inner faces of adjacent cleat members 5, 7, and 11. Cross frame members 17 and 18 of end member 14 will similarly engage the adjacent cleat members at the opposite end of the container. Under these conditions there will be space between cleat 12 and the top frame part 15 and between cleat 8 and the bottom frame part 16 in which the end closing panel 25 may be inserted so as to lie in the plane of the cross frame members 17 and 18, as will be apparent from observation of FIGURES 2, 3, and 7, as respects the end member 14 and a similar condition will exist with respect to end member 13.

The insertable end closing panel 25 will be formed of any suitable flexible sheet material such as fiber board or corrugated fiber board or like material which is sufficiently resilient so that the same may be scored as at 25a and bent after the manner indicated in FIGURES 3 and 7 so that its upper and lower edges of the panel 25 may be received between and held in place by engagement with adjacent cleat members and the upper and lower frame parts 15 and 16 spaced from said cleat members. When the panel 25 is fully inserted as shown in FIGURE 4 it will lie in the plane of the cross frame parts 17 and 18 of the end member.

After completion of the process of freezing the poultry packed in the container the openings in the end members 13 and 14 will be closed by insertion of the end closing panel members 25 after the manner just described, whereupon the container with the frozen poultry therein will be ready for shipment.

Now referring to the modification of the invention shown in FIGURES 8 to 13 inclusive the container is identical with that previously described except that the construction of the end members is somewhat different. The end members of this modified construction are designated generally by the numeral 26 and, as shown, each comprises an upper or top frame part 28 and a lower frame part 29 which are disposed in a common plane and these end members further comprise the cross frame parts 30 and 31 secured to the parts 28 and 29 in a manner such as indicated with reference to FIGURE 5. The cross frame parts 30 and 31 are disposed in a common plane offset from the plane of the frame parts 28 and 29. The frame parts 28 and 29 are preferably made of relatively stiff material such as previously described and the cross frame parts 30 and 31 are preferably formed of flexible material such as fiber board or corrugated fiber board or like material. Each of the frame parts 30 and 31 comprises a hinge portion for the respective end member, said hinge portion being formed of a single piece of such flexible material. The hinge portion of frame part 30 includes an edge securing part 30a and a main body part 30b hingedly movable relative to the part 30a. The hinge portion or frame part 30 may be scored as indicated at 30c intermediate the parts 30a and 30b to facilitate such hinge movement. The hinge portion or frame part 31 is formed like the part 30. The end members 26 are secured to the mat at the opposite side edges thereof as shown in a manner similar to that described with reference to the end members 13 and 14, the edge securing parts 30a being inserted between the cleat 7 and the side member 2 or between the cleat 8 and the side member 2 and secured by the same staples that serve to secure the binding wires 19 and 22 and which pass through the side member 2 and the edge securing parts 30a and into the cleat.

After the container in FIGURES 8 to 13 is formed to box form as in FIGURE 9 the flexible insertable panel may be inserted in the manner indicated in FIGURES 9 and 12. In this connection it will be noted that the construction of the end members 26 is such that the top and bottom frame members 28 and 29 will engage the inner faces of the adjacent cleat members and the cross frame parts 30 and 31 will be spaced inwardly therefrom when the container is formed to box form as in FIGURE 9. Under such condition the ends of the flexible panel 32 may be slightly bowed as indicated in FIGURES 9 and 12 so that the ends thereof can be inserted between and held in place by engagement with the adjacent cleat members and the cross frame members 30 and 31. In this connection it will be noted that one end of the panel 32 is received between the cleat 6 and the frame part 30 and the other end of said panel 32 is received between the cleat 10 and the frame part 31, so that when the panel 32 is fully inserted, it will lie in the plane of the frame parts 28 and 29.

Referring now to the modification of the invention shown in FIGURES 15, 16, 17 and 18, the container is identical with that previously described except that the construction of the end members is again somewhat different. The end members of this modified construction are designated generally by the numeral 35 and each member 35 comprises an upper frame part 36 and a lower frame part 37 comprising a hinge portion for the respective end member, said end member 35 further comprising cross frame parts 38, 39, 40 and 41 secured to the upper and lower frame parts 36 and 37. As best seen in FIGURES 16 and 18, the upper ends of the cross frame parts 38, 39, 40 and 41 are secured to the rear or inner side of the upper frame part 36 while the lower ends of the frame parts 38, 39, 40 and 41 are secured to the front or outer side of the lower frame part 37. The frame parts 36, 38, 39, 40 and 41 are preferably made of relatively stiff material such as previously described and the lower frame part 37 comprising a hinge portion formed of flexible material such as fiber board or corrugated fiber board or like material. The hinge portion or frame part 37 includes an edge securing part 37a and a main body part 37b hingedly movable relative to the part 37a. The hinge portion or frame part 37a may be scored as indicated at 37c to facilitate such hinge action.

When the container of FIGURES 15 to 18 inclusive is formed to box form after the manner indicated in FIGURES 9 and 10, the upper frame part 36 will engage the inner faces of adjacent cleats such as 6, 12 and 10 while the cross frame parts 38, 39, 40 and 41 will be spaced inwardly from such adjacent cleats. The arrangement of the cross frame parts provides openings in the end member 35 for purpose previously indicated. The openings in the end member 35 may be closed by insertion of the insertable panels 32 which are the same as those previously described in conjunction with the construction of FIGURES 8 to 13 inclusive and are inserted in the same manner as will be apparent upon reference to FIGURES 16 and 17.

The construction of end members shown in FIGURES 15 to 18 inclusive has the advantage of providing the intermediate cross frame members 39 and 40 for added strength and yet the construction is such as to permit the end members 35 to lie flat against the bottom member 2 when the container mats are shipped in knockdown condition as shown in FIGURE 15.

In the modification of FIGURE 19 the containers are identical with those previously described and the end members are the same as those shown in FIGURES 2 to 7 inclusive. The modification of FIGURE 19 has to do with the manner of inserting and attaching the end closing panel 25' which is similar to the panel 25 previously referred to except that the narrower margin extending from the score portion 25'a is bent outwardly to form a flange as at 25'b which is positioned for engagement with the upper face of the cleat member 8, the upper end of the panel 25' being inserted between cleat member 12 and the upper frame part 15 of end member 13 or 14 as in the case of the construction of FIGURES 2 to 7 inclusive. When the panel 25' is thus disposed as shown in FIGURE 19 the flange portion 25'b may be stapled or nailed to the cleat 8 as indicated at 45.

In the manufacture of containers of the general type to which my invention particularly appertains, it is common to use machines in which the mat parts are placed and fed to stapling devices where the binding wires and cleat members are stapled to the side members to form complete units.

Such machines are equipped with endless feed bands and the processing as heretofore practiced involves first placing the cleat members in positions on said feed bands then placing the panels comprising the side members in positions superimposed upon the cleat members, after which the mat parts are moved by the endless belt to the stapling devices, at which position the binding wires are brought into contact with the side members and stapled thereto, the cleat members being at the same time stapled to the side members. The method of making the container mats according to my invention, with the use of such machines involves the same processing, except that end members 13, 14 or 26, 27 or 35 are placed in position with their edge securing parts superposed upon the cleat members 7 and 8 before placing the side member 2 in position superposed upon said end members, so that as the mat parts (moved by the feed band) pass through the machine and are stapled, the end members are at the same time hingedly secured to the opposite side edges of the mat by means of the staples 23 serving to secure the binding wires 19 and 22 and the cleats 7 and 8 to the side member 2.

In the use of such apparatus for the purpose of securing the end members in the manner indicated, difficulty would be encountered in properly supporting the end members for movement with the mat; and difficulty would also be encountered in connection with the stapling of the intermediate binding wires disposed intermediate the side edges of the mat.

My present invention contemplates improvements in such apparatus which are designed to eliminate these difficulties. In this connection reference is now made to FIGURE 14 wherein the essential parts of such apparatus embodying improvements of the invention are illustrated, the same including the channel shaped side frame members 50 within which are disposed the endless belt feed bands 51 which move in unison to carry the parts of the mat A toward and beyond the stapling heads 52 and 56 which staple the binding wires to the side members of the mat A. Disposed centrally between the side rails 50 immediately below the stapling heads 52 is a clincher anvil 53 which is positioned just below the plane of travel of the side members 1, 2, 3, and 4 of the mat A. The single clincher anvil 53 extends beneath both stapling heads 52 and is supported in this position by a central post 54 which is disposed centrally between the side channel members 50 so that it will not interfere with the travel movements of the end members such as 13, 14 of the mat A as it is moved by the feed bands 51 toward and beyond the stapling heads. Extending longitudinally of the path of travel of the mat A through the apparatus and disposed intermediate the side frame channels 50 are guide channels 55 for supporting the free ends of the end members such as 13, 14 during the travel movement of the mat A.

In the use of the apparatus above described, the cleat members 5, 7, 9 and 11 are first laid on one of the feed bands 51 and the cleat members 6, 8, 10 and 12 are laid on the other feed band 51 after which the end members are placed in position with their edge securing parts superposed on the cleat members 7 and 8 and their free ends supported on the guide rails 55 in the manner shown by FIGURE 14, whereupon the side members 1, 2, 3 and 4 are disposed in position with the side member 1 superposed on the cleats 5 and 6, the side member 2 superposed on the edge securing parts of the end members such as 13, 14, the side member 3 superposed upon the cleat members 9 and 10 and the side member 4 superposed upon the cleat members 11 and 12.

When the parts of the mat A have been disposed as just described, the feed bands 51 are caused to move in unison to move the mat A toward and beyond the location of the stapling heads 52 and 56. These stapling heads operate in timed relation relative to the movement of the mat A to cause staples to be inserted periodically which serves to secure the binding wires 19, 20, 21 and 22 which binding wires have previously been disposed as shown in FIGURE 14 longitudinally of the direction of travel of the mat A through the machine. In this connection it will be noted that the stapling heads 56 serve to secure the binding wires 19 and 22 and the staples inserted by the stapling heads 56 pass through the side members and into the cleats; and the staples that are inserted through the side member 2 also pass through the edge securing parts of the end members such as 13, 14 and pass into the cleats 7, 8. The stapling heads 52 serve to secure the intermediate binding wires 20 and 21 and the staples inserted thereby are clinched by the clinching anvil 53, it being noted that the anvil 53 is disposed immediately below the stapling heads 52, below the path of movement of the side members, and between the side members and the guide rails 55 whereby the anvil 53 will not interfere with the travel movement of the end members such as 13, 14 the free ends of which are supported on the guide rails 55.

The end panels 25 are preferably scored as at 25a, as shown, to facilitate insertion in the ends of the container as described.

I claim:

1. A knock-down container of the class described, comprising, in combination, relatively hingeable side members, a respective cleat member disposed at each side edge of each side member, and a pair of end members each comprising a first set of spaced frame parts, and a second set of spaced frame parts secured to said first frame parts, the frame parts of each end member providing an opening therein, one of the frame parts of one set engaging the inner faces of adjacent cleat members, and the frame parts of the other set being disposed in a common plane spaced from said adjacent cleat members, and a separate panel member for each end member insertable between said second frame parts and said adjacent cleat members to lie in the plane of the first frame part which engages said cleat members for closing the opening in the respective end member.

2. A container as in claim 1 wherein one of said frame parts of each end member comprises a hinge element formed of flexible material and having an edge securing part, each end member having its edge securing part separately inserted between a respective cleat member and its respective side member, and fastening members securing said side members to said cleat members and also securing said edge securing parts between the respective cleat member and its respective side member.

3. A container as in claim 1, wherein said second frame parts include top and bottom frame parts and said bottom frame part comprises a hinge element formed of flexible material and having an edge securing part, each end member having its edge securing part separately inserted between a respective cleat member and its respective side member, at opposite ends of the container, and fastening members securing said side members to said cleat members and securing said edge securing parts between the respective cleat member and its respective side member.

4. A container as in claim 1, wherein said first frame parts comprise top and bottom frame parts and said second frame parts each comprise a hinge element formed of flexible material and having an edge securing part, each end member having its edge securing parts separately inserted between a respective cleat member and its respective side member, and fastening members securing said side members to said cleat members and securing said edge securing parts between the respective cleat member and its respective side member.

5. A container as in claim 1, wherein one of said frame parts of each end member comprises a hinge element formed of flexible material and having an edge securing part, each end member having its edge securing part separately inserted between a respective cleat member and its respective side member, at opposite ends of the container, a respective binding wire extending around the container at each end thereof, and fastening members securing said wires to said side members, and serving to connect the side members to one another in relatively hingeable relation, said fastening members also securing said side members to said cleat members and securing said edge securing parts between the respective cleat member and its respective side member.

6. A container as in claim 1, wherein said first frame parts include top and bottom frame parts, said top frame part engaging the adjacent cleat members as aforesaid, the said bottom frame part comprising a hinge element formed of flexible material and having an edge securing part and a body portion, the body portion of the bottom frame part being secured to one side of the second frame parts while the top frame part is secured to the opposite side of said second frame parts, each end member having its edge securing part separately inserted between a respective cleat member and its respective side member, at opposite ends of the container, and fastening members securing said side members to said cleat members and securing said edge securing parts between the respective cleat member and its respective side member.

7. A container as in claim 1, wherein said separate panel member has a laterally extending flange portion engageable with one of the cleat members.

8. A knock-down container of the class described, comprising, in combination, a mat consisting of relatively hingeable side members, a respective cleat member disposed at each side edge of each side member, and a pair of separate end members each comprising a hinge portion formed of a single piece of flexible material, each hinge portion comprising a main body part and an edge securing part, both parts constituting integral parts of said single piece of material, said main body parts being hingedly movable relative to said edge securing parts, each end member having its edge securing part separately inserted between a respective cleat member and its respective side member, at opposite side edges of the mat, a respective binding wire extending longitudinally along each respective side edge of the mat and engaging the side members, and fastening members securing said wires to said side members, said fastening members also securing said side members to said cleat members and securing said edge securing parts between the respective cleat member and its respective side member, said wires serving to connect the side members to one another in relatively hingeable relation.

9. A knock-down container of the class described, comprising, in combination, relatively hingeable side members, a respective cleat member disposed at each side edge of each side member, and a pair of end members each comprising a first pair of spaced frame parts in a common plane and engaging the inner faces of the adjacent cleat members, and a second pair of spaced frame parts secured to said first frame parts and disposed in a common plane spaced from said adjacent cleat members, the frame parts of each end member providing an opening therein, and a separate panel member for each end member insertable between said second frame parts and said adjacent cleat members to lie in the plane of said first frame part for closing the opening in the respective end member.

References Cited in the file of this patent
UNITED STATES PATENTS

| | | |
|---|---|---|
| 1,894,179 | Kubes | Jan. 10, 1933 |
| 2,010,441 | Scott | Aug. 6, 1935 |
| 2,032,032 | Whiton | Feb. 25, 1936 |
| 2,035,992 | Sirnec | Mar. 31, 1936 |
| 2,293,361 | Roberts | Aug. 18, 1942 |